July 27, 1965 K. H. KUPFER 3,197,706
ULTRA HIGH-FREQUENCY SUPERHETERODYNE RECEIVER OF THE KIND COMPRISING A MIXING DIODE
Filed Nov. 20, 1961
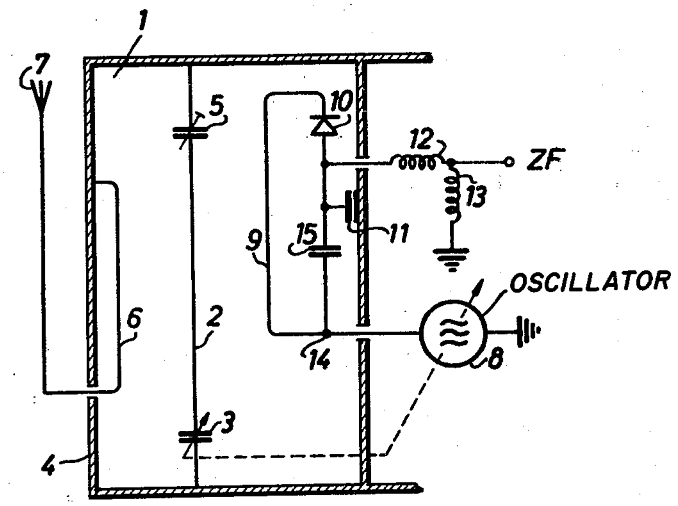
INVENTOR
KARL H. KUPFER
BY Frank R. Trifari
AGENT United States Patent Office 3,197,706
Patented July 27, 1965

3,197,706

ULTRA HIGH-FREQUENCY SUPERHETERODYNE RECEIVER OF THE KIND COMPRISING A MIXING DIODE

Karl Heinz Kupfer, Krefeld, Germany, assignor to North American Philips Company, Inc., New York, N.Y., a corporation of Delaware Filed Nov. 20, 1961, Ser. No. 153,465
Claims priority, application Germany, Dec. 29, 1960, P 26,308
3 Claims. (Cl. 325—445)

This invention relates to an ultra high-frequency superheterodyne receiver circuit of the type comprising a cavity resonator tuned to the input oscillations and a mixing diode. The diode is connected between a terminal of a source of local oscillations and a grounded capacitor, and is in series with a loop coupled to the input oscillations in the cavity resonator.

Such a mixing stage may be employed in a converter, in which very high frequency oscillations are converted to a region of frequencies lower by several hundred megacycles than the input oscillations.

The coupling loop connected between the source of local oscillations and the diode provides an inductive load for the local oscillator, and produces a phase shift of, for example 70 to 80° between the current and the voltage. Moreover, the phase of the local oscillations varies along the coupling loop. It appears that for producing a given voltage at the mixing diode, the local oscillations must have a given, comparatively high amplitude at the oscillator terminal, and that therefore the oscillator must be capable of producing oscillations of comparatively large amplitude.

According to the present invention, in a very high frequency superheterodyne receiver, a considerably smaller generator may suffice, so that even at very high frequencies an adequate amplitude of the generator oscillations can be obtained at the mixing diode, if the diode is connected to the end of the coupling loop remote from the oscillator terminal, and a capacitor is connected between the end of the coupling loop connected to the oscillator and the diode electrode remote from the coupling loop. The capacitor produces a phase shift for the local oscillations between the oscillator terminal and one electrode of the diode, this phase shift being opposite to the phase shift produced between the oscillator terminal and the other electrode of the diode.

The invention will now be explained more fully with reference to the drawing, which illustrates the diode mixing stage of a very high frequency superheterodyne receiver.

A cavity resonator 1 is provided with an internal conductor 2. One end of conductor 2 is connected to the wall 4 of the resonator, preferably by way of a tunable capacitor 3. A trimmer capacitor 5 is connected between the other end of the internal conductor 2 and the wall 4. The cavity resonator 1, which may have various conventional shapes, is tuned to the oscillations to be received. The input oscillations are fed directly or via a preamplifier to the coupling loop 6 from an aerial 7.

The oscillations of an oscillator 8 are fed to one end of a coupling loop 9. The other end of the loop is connected to the cathode of a diode 10. The anode of the diode 10 is connected by way of a capacitor 11 to the wall of the cavity resonator 1, and by way of a choke 12 to the output terminal ZF. Output intermediate frequency signals are derived from the terminal ZF. An inductor 13 is preferably connected between the output terminal and ground. The inductor 13 and the connected capacitors, preferably the capacitor 11, are tuned to the intermediate frequency.

The coupling loop 9 and the diode 10 constitutes an inductive load for the generator 8, and may produce a phase shift of 70 to 80° between the current and voltage. In the coupling loop 9 a different phase shift occurs. Consequently, a given oscillator voltage at the cathode of the diode 10 requires a given value of the oscillator amplitude at the other end of the coupling loop 9. The oscillator 8 must therefore supply a given power. The required power determines the size of the generator, particularly of the amplifying element employd, for example an electron valve, and the direct-current power to be supplied.

In accordance with the invention a considerable reduction of the required amplitude of the oscillations can be obtained, by connecting a capacitor 15 of, for example, 3 pf., between the terminal 14 of the source of oscillations and the anode of the diode 10, remote from the coupling loop 9.

Across the capacitor 15, which may be considered to be connected in series with the capacitor 11 of, for example, 15 pf., a phase shift for the local oscillations occurs. This phase shift is opposite the phase shift across the coupling loop 9. As a result the amplitude of the local oscillations between the anode and the cathode of the diode 10 increases materially. In a practical embodiment an improvement by a factor of about 2 was found to occur. To the same extent the amplitude of the oscillations from the generator 8 can be reduced, so that a considerable economy is attained.

Owing to the above effect, particularly to the phase shift obtained by means of the capacitor 15, the terminal 14 not only has the inductive load due to coupling loop 9 but also an approximately equal capacitative load. The reactive components compensate each other substantially completely. Thus a kind of resonance is obtained.

In a receiver tunable in a wide region of, for example, 450 to 800 mc./s., in which the capacitor 3 is coupled with the tuning element of the generator 8, it is advisable to proportion the circuit elements, particularly the capacitor 15 so that the impedance occurring at the terminal 14 of the generator oscillations is substantially in resonance at the high frequencies at the upper limit of the tuning region. Thus at the high frequencies a satisfactory coupling between the oscillator and the mixing diode is obtained, so that an improved mixing effect occurs even when the amplitude of the generator oscillations at these high frequencies has a lower value than with low frequencies.

What is claimed is:

1. A mixer for very high frequency signals comprising a source of said signals, a source of local oscillations, a cavity resonator, means tuning said cavity resonator to the frequency of said signals, means coupling said signals to said cavity resonator, a loop coupled to said cavity resonator, means connecting one end of said loop to said source of local oscillations, a diode having one electrode connected to the other end of said coupling loop, means for deriving intermediate frequency signals from the other electrode of said diode, and a capacitor connected between said one end of said loop and the other electrode of said diode, said capacitor providing opposite phase shift for said oscillations of said local oscillator between said one end of said loop and said other electrode than the phase shift provided by said loop.

2. A mixer for very high frequency signals comprising a source of said signals, a source of local oscillations having a range of frequencies, a cavity resonator, means tuning said cavity resonator to the frequency of said signals, means coupling said signals to said cavity resonator, a loop coupled to said cavity resonator, means connecting one end of said loop to said source of local oscillations, a diode having one electrode connected to the other end of said coupling loop, means for deriving intermediate frequency signals from the other electrode of said diode, and a capacitor connected between said one end of said loop and the other electrode of said diode, said capacitor in combination with said loop and diode forming a resonant circuit at a frequency within the range of frequencies of said oscillator.

3. A mixer of very high frequency signals comprising a source of said signals, a source of local oscillations, a cavity resonator, means for tuning said resonator to the frequency of said signals, means for coupling said signals to said cavity resonator, a series circuit comprising a first capacitor, a diode and a coupling loop coupled to said cavity resonator connected in that order between a wall of said cavity resonator and said source of local oscillations, a second capacitor connected between the junction of said first capacitor and said diode and the junction between said coupling loop and said source of local oscillations, and means for deriving an intermediate frequency signal from the junction of said first capacitor and said diode.

References Cited by the Examiner

UNITED STATES PATENTS

| | | | |
|---|---|---|---|
| 2,653,228 | 8/51 | Pan | 325—436 |
| 2,962,586 | 11/60 | Maurer | 325—445 |
| 2,991,359 | 7/61 | Danker | 325—438 |

DAVID G. REDINBAUGH, *Primary Examiner.*